United States Patent
Berne (10) Patent No.: US 11,613,207 B2
(45) Date of Patent: Mar. 28, 2023

(54) CAMERA MONITORING SYSTEM WITH A DISPLAY DISPLAYING AN UNDISTORTED PORTION OF A WIDE ANGLE IMAGE ADJOINING AT LEAST ONE DISTORTED PORTION OF THE WIDE ANGLE IMAGE

(71) Applicant: Volvo Truck Corporation, Gothenburg (SE)

(72) Inventor: Nicolas Berne, Heyrieux (FR)

(73) Assignee: Volvo Truck Corporation, Gothenburg (SE)

( * ) Notice: Subject to any disclaimer, the term of this patent is extended or adjusted under 35 U.S.C. 154(b) by 0 days.

(21) Appl. No.: 16/771,082

(22) PCT Filed: Jan. 5, 2018

(86) PCT No.: PCT/IB2018/000137
§ 371 (c)(1),
(2) Date: Jun. 9, 2020

(87) PCT Pub. No.: WO2019/135099
PCT Pub. Date: Jul. 11, 2019

(65) Prior Publication Data
US 2021/0178967 A1 Jun. 17, 2021

(51) Int. Cl.
*B60R 1/00* (2022.01)
*G06F 3/01* (2006.01)

(52) U.S. Cl.
CPC ............... *B60R 1/00* (2013.01); *G06F 3/012* (2013.01); *G06F 3/013* (2013.01);
(Continued)

(58) Field of Classification Search
None
See application file for complete search history.

(56) References Cited

U.S. PATENT DOCUMENTS

| 2005/0012685 A1 | 1/2005 | Okada et al. |
| 2011/0234475 A1 | 9/2011 | Endo |

(Continued)

FOREIGN PATENT DOCUMENTS

| EP | 2476587 A1 | 7/2012 |
| EP | 2551817 A2 | 1/2013 |

(Continued)

OTHER PUBLICATIONS

English Translation of EP-3029929-A1, Mekra Lang GmbH and Co KG, Published Jun. 8, 2016. Obtained through Patent Translate. (Year: 2016).*

(Continued)

*Primary Examiner* — Rebecca A Volentine
(74) *Attorney, Agent, or Firm* — Withrow & Terranova, PLLC (57) ABSTRACT

This camera monitoring system (20) is intended for providing to a user a view of a scene captured by a camera. To that end, the camera monitoring system (20) comprises a wide angle camera (22A, 22B) for capturing a wide angle image of a scene, a determination unit (28) for determining an area of interest in the scene, an image treatment system (24A, 24B) for providing an undistorted portion, including the area of interest, of the wide angle image, and a display (26A, 26B) for displaying a continuous displayed image of the wide angle image. The displayed image comprises the undistorted portion adjoining at least one distorted portion of the wide angle image.

11 Claims, 4 Drawing Sheets

(52) U.S. Cl.
CPC ... *B60R 2300/105* (2013.01); *B60R 2300/306* (2013.01); *B60R 2300/602* (2013.01); *B60R 2300/806* (2013.01)

(56) References Cited

U.S. PATENT DOCUMENTS

| | | | | |
|---|---|---|---|---|
| 2013/0027558 | A1* | 1/2013 | Ramanath | G06T 3/0018 348/148 |
| 2013/0278715 | A1* | 10/2013 | Nutsch | H04N 5/23238 348/38 |
| 2014/0368606 | A1* | 12/2014 | Bassi | H04N 13/305 348/36 |
| 2017/0129405 | A1* | 5/2017 | Oba | B60R 1/08 |

FOREIGN PATENT DOCUMENTS

| | | |
|---|---|---|
| EP | 3029929 A1 | 6/2016 |
| WO | 2014204794 A1 | 12/2014 |

OTHER PUBLICATIONS

International Search Report and Written Opinion for International Application No. PCT/IB2018/000137, dated Jun. 28, 2018, 12 pages.

Examination Report for European Patent Application No. 18710911.1, dated May 19, 2021, 6 pages.

Examination Report for European Patent Application No. 18710911.1, dated Oct. 28, 2021, 4 pages.

* cited by examiner

CAMERA MONITORING SYSTEM WITH A DISPLAY DISPLAYING AN UNDISTORTED PORTION OF A WIDE ANGLE IMAGE ADJOINING AT LEAST ONE DISTORTED PORTION OF THE WIDE ANGLE IMAGE

This application is a 35 USC 371 national phase filing of International Application No. PCT/IB2018/000137, filed Jan. 5, 2018, the disclosure of which is incorporated herein by reference in its entirety.

The present invention concerns a camera monitoring system for providing to a user a view of a scene captured by a camera.

This camera monitoring system is more particularly intended to provide the user with a view of the environment of a vehicle driven by the user.

Conventionally, automotive vehicles are equipped with wing mirrors to provide the driver of the automotive vehicle with a view of the sides of the vehicle. These wing mirrors are usually divided into two portions providing different fields of vision. Generally, the portion of the wing mirror which is the closest to the driver consist of a main exterior rear-view mirror, while the portion of the wing mirror farther from the driver consists of a wide angle exterior mirror.

These mirrors have different horizontal average magnification factors, said horizontal average magnification factors consisting of the relation of the angular size of an object as it is perceived by the driver on the mirror upon the angular size of the object as it would be seen by an observer placed at the position of the wing mirror; the main exterior rear-view mirror has the highest horizontal average magnification factor, while the wide angle exterior mirror has a lower horizontal average magnification factor.

Several standards define more precisely the requirements that the main exterior rear-view mirrors and the wide angle exterior mirrors must meet. In Europe, this definition is provided by UNECE Regulation No. 46 on "Uniform provisions concerning the approval of devices for indirect vision and of motor vehicles with regard to the installation of these devices", in which the main exterior rear-view mirrors are defined as class II mirrors, and the wide angle exterior mirrors are defined as class IV mirrors.

The use of mirrors has however been unsatisfactory and we now meet a trend of replacing conventional wing mirrors with camera monitoring systems comprising cameras for capturing views of the sides of the vehicle and screens for displaying the views captured by the cameras. These camera monitoring systems are intended to provide at least the functionalities provided by the conventional mirrors and, thus, to provide a view corresponding to the view provided by a main exterior rear-view mirror and a view corresponding to the view provided by a wide angle exterior mirror.

The most common solution consists of providing the camera monitoring systems with a first screen closest to the driver providing a first view similar to the view provided by a main exterior rear-view mirror, and a second screen farther from the driver while adjoining the first screen, said second screen providing a second view similar to the view provided by a wide angle exterior mirror.

However, such a solution is unsatisfactory when it equips a trailer truck. Indeed, it is common that, when the truck is turning, the end of the trailer will leave the image provided by the first screen and enter the image provided by the second screen, where the driver will have wrong estimation of distances because of the lowest horizontal average magnification factor. And while, with conventional mirrors, this problem could be circumvented by the driver craning his head, this is no longer possible with the screens of the camera monitoring systems.

One aim of the invention is thus to allow provision to the driver of a trailer truck of a view of the sides of his truck that will help him in evaluating distances in the critical areas on which he will have to draw his attention. Other aims of the invention are to provide this view in a manner that will be ergonomic to the driver and to limit the calculations necessary to provide this view.

To that end, the invention relates to a camera monitoring system comprising
  a wide angle camera for capturing a wide angle image of a scene,
  a determination unit for determining an area of interest in the scene,
  an image treatment system for providing an undistorted portion, including the area of interest, of the wide angle image, and
  a display for displaying a continuous displayed image of the wide angle image, the displayed image comprising the undistorted portion adjoining at least one distorted portion of the wide angle image.

According to specific embodiments of the invention, the camera monitoring system also has one or more of the following features, considered alone or according to any technically possible combination(s):
  the wide angle image has first and second preset limits and the displayed image has first and second opposed borders, the or each distorted portion being interposed between the undistorted portion and a respective one of the first and second borders, the display being configured to display the first preset limit at the first border and the second preset limit at the second border independently of the position of the area of interest;
  the undistorted portion has a first average magnification factor along a first direction of the displayed image and a second average magnification factor along a second direction, orthogonal to the first direction, of the displayed image, the first and second average magnification factors being substantially equal to each other;
  the first and second borders are spaced away from each other along the second direction, and are preferably substantially parallel to the first direction;
  the or each distorted portion has a primary average magnification factor along the first direction and a secondary average magnification factor along the second direction, the primary average magnification factor being substantially equal to the first average magnification factor, the secondary average magnification factor being inferior to the second average magnification factor;
  for the or each displayed distorted portion, the undistorted portion has an interface edge in contact with said distorted portion, the interface edge extending along the first direction;
  the first average magnification factor is comprised between 0.2 and 1.0;
  the determination unit comprises a head tracking unit for tracking movement of a head of the user;
  the determination unit comprises a gaze tracking unit for tracking movement of a gaze direction of the user;
  the display is configured for displacing the undistorted portion in the displayed image depending on the position of the area of interest in the scene; and
  the wide angle camera is configured for refreshing the wide angle image at a predetermined frequency.

The invention also concerns an automotive vehicle comprising the camera monitoring system defined above, the wide angle camera being oriented toward the rear of the vehicle, the display comprising a display surface on which the displayed image is presented, said display surface being positioned in the field of view of the driver.

According to a specific embodiment of the invention, the automotive vehicle also has the following feature:

the determination unit comprises a trailer tracking unit for tracking position of the trailer relatively to the tractor.

The invention also concerns a method for providing to a user a view of a scene captured by a camera, wherein said method comprises:

capturing a wide angle image of a scene with a wide angle camera, determining an area of interest in the scene, providing an undistorted portion, including the area of interest, of the wide angle image, and displaying a continuous displayed image of the wide angle image, the displayed image comprising the undistorted portion adjoining at least one distorted portion of the wide angle image.

Other features and advantages of the invention will appear upon reading the following description, provided solely as an example and done in reference to the appended drawings, in which.

Figure 1:
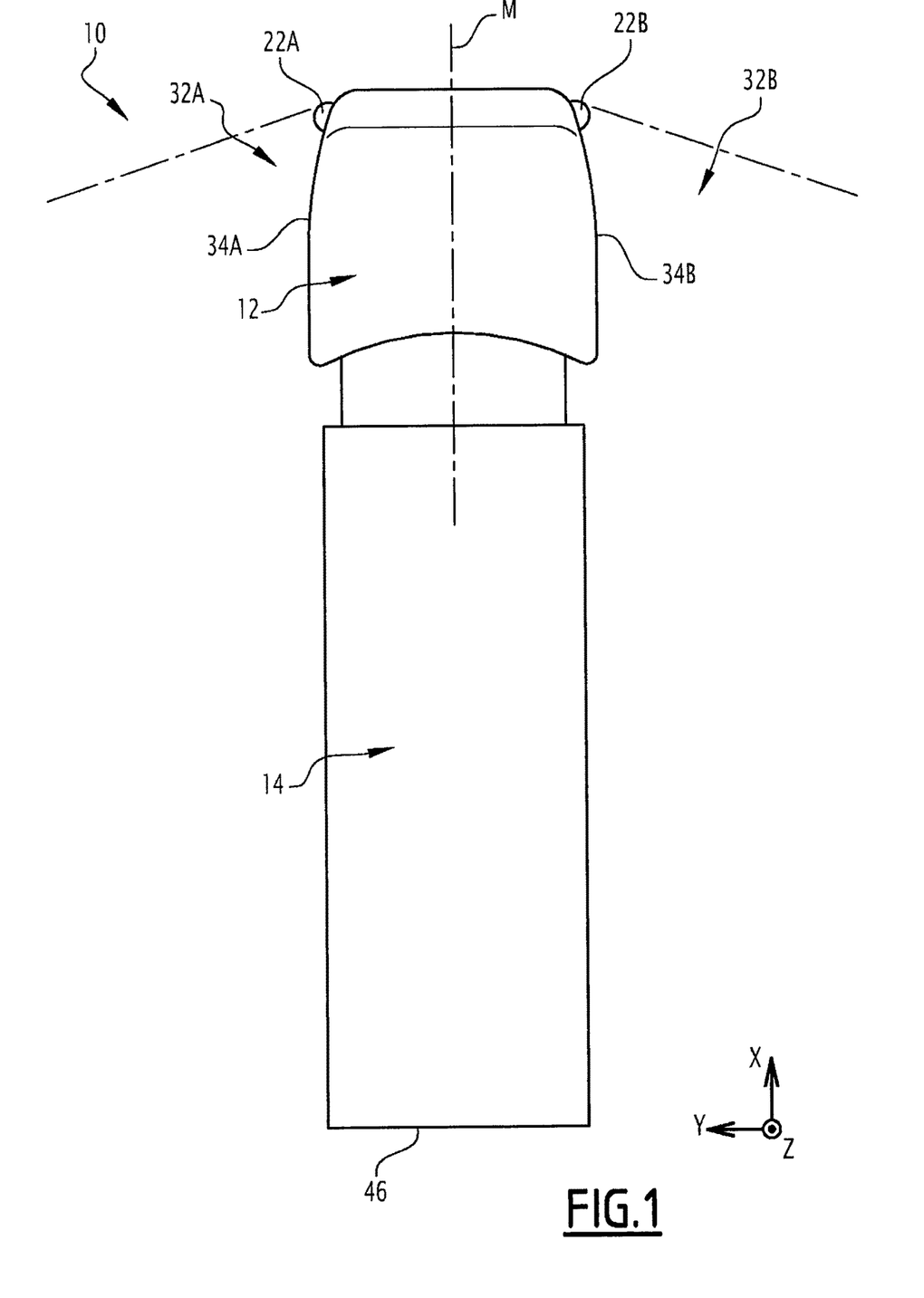
FIG. 1 is a view from above of an automotive vehicle according to the invention.

The automotive vehicle 10 of FIG. 1 consists of a trailer truck. It comprises, in a known manner, a tractor 12 and a trailer 14 towed by the tractor 12. The tractor 12 houses a cabin 16 (FIG. 3) intended for the driver of the truck 10.

In the following, the orientation terms are intended in reference to the usual orthogonal orientation reference frame of automotive vehicles, shown in FIG. 1, and which comprises:

a longitudinal axis X, oriented from the rear toward the front, a transversal axis Y, oriented from the right toward the left, and a vertical axis Z, oriented from the bottom toward the top.

The driver of the truck 10, while sitting in the cabin 16, is usually looking toward the road in front of the truck 10, where the truck 10 is heading. However, for some manoeuvers, the driver needs to have a view of the sides of the truck 10, while keeping an eye on the road in front of the truck 10. Since these sides are out of the field of view of the driver, a device is needed to provide the required view to the driver.

Figure 2:
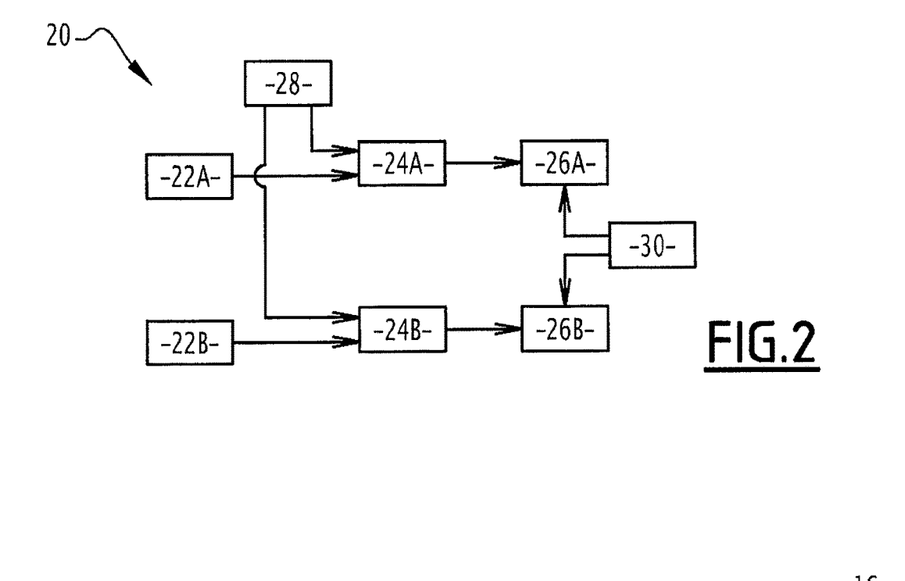
FIG. 2 is a block diagram of a camera monitoring system of the automotive vehicle of FIG. 1.

To that end, the truck 10 comprises a camera monitoring system 20, shown in FIG. 2. This camera monitoring system 20 is preferably exclusively on board of the tractor 12.

This camera monitoring system 20 comprises two cameras 22A, 22B, each able to capture an image of a respective scene, and, for each camera 22A, 22B, an image treatment system 24A, 24B and a display 26A, 26B. The camera monitoring system 20 further comprises a determination unit 28 for determining, for each camera 22A, 22B, an area of interest in the scene imaged by the camera 22A, 22B, and a configuration unit 30 for configuring each display 26A, 26B.

As shown in FIG. 1, a first one 22A of the cameras 22A, 22B is provided on the left side of the tractor 12, while the second camera 22B is provided on the right side of the tractor 12. Both cameras 22A, 22B are oriented toward the rear of the truck 10, which means that the scene imaged by each camera 22A, 22B is positioned rearward of the camera 22A, 22B. In other words, the field of view 32A, 32B of each camera 22A, 22B is centered on a direction extending rearward from the camera 22A, 22B.

Each camera 22A, 22B is in particular oriented so that its field of view 32A, 32B includes a respective side 34A, 34B of the tractor 12.

Each camera 22A, 22B consists in particular of a wide angle camera, which means that each camera 22A, 22B is able to capture a wide angle image of the scene imaged by the camera. In other words, the angular extent of the field of view 32A, 32B of the camera 22A, 22B is wide, i.e. is wider than 20 degrees.

More specifically, it is the horizontal angular extent of the field of view 32A, 32B of the camera 22A, 22B which is wide. It is not necessary for the vertical angular extent of the field of view of any of the cameras 22A, 22B to be wide. Preferably, the vertical angular extent of the field of view of both cameras 22A, 22B is comprised between 5 and 20 degrees.

Figure 4:
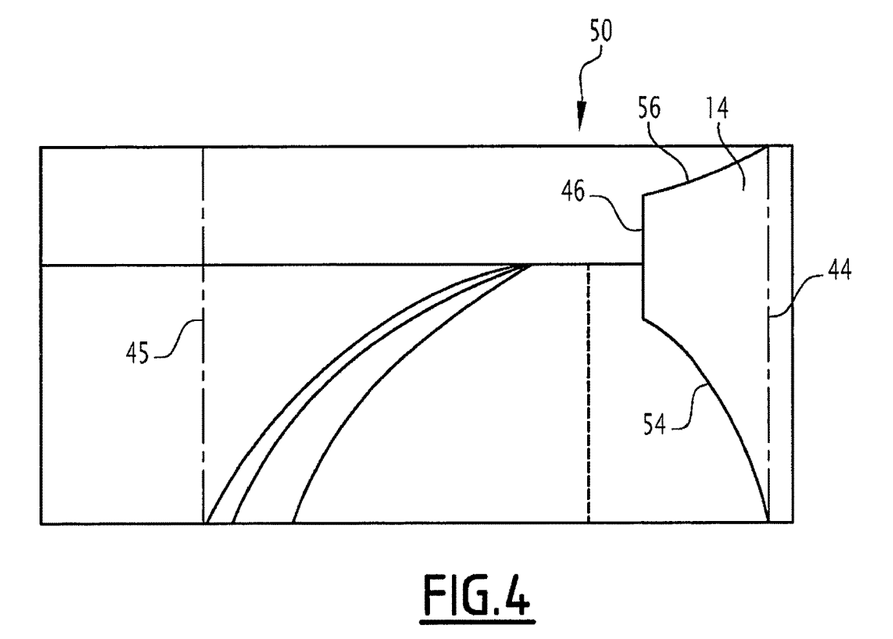
FIG. 4 is a view of a first wide angle image provided by a camera of the camera monitoring system of FIG. 2.
Figure 6:
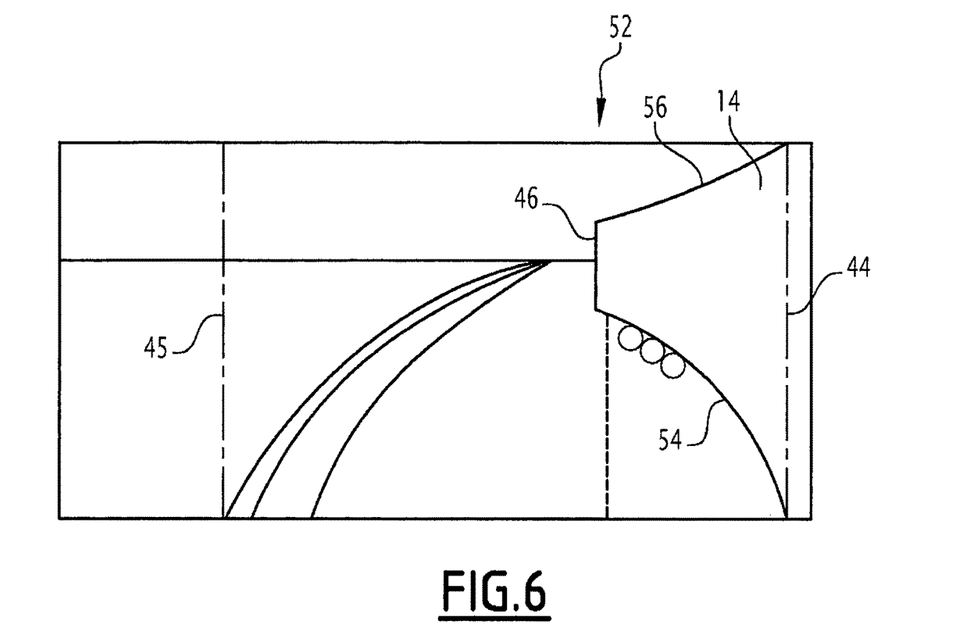
FIG. 6 is a view of a second wide angle image provided by the camera of the camera monitoring system of FIG. 2.

As a result thereof, the images provided by the cameras 22A, 22B are distorted, as can be seen on FIGS. 4 and 6, where examples 50, 52 of images captured by the right camera 22B are provided. By "distorted", it is meant that the magnification factor of these images changes across the field of view at a fixed working distance. In other words, the relation of a dimension of an object as it is shown in the image 50, 52 upon the angular size of the object as it is seen by the camera 22A, 22B changes depending on the location of the object in the image 50, 52. As can be seen on these images 50, 52, as a result of this distortion, right lines, such as the edges 54, 56 of the trailer 14, appear curved on the images 50, 52.

Each camera 22A, 22B is configured for refreshing the image of its respective scene at a predetermined frequency, said frequency being preferably comprised between 40 and 80 frame per second, preferably between 50 and 70 frame per second.

The displays 26A, 26B comprise a first display 26A associated with the first camera 22A and a second display 26B associated with the second camera 22B. Each display 26A, 26B is configured for displaying, in the field of view of the driver of the truck 10, a displayed image of the image captured by its associated camera 22A, 22B. Examples 60, 62 of such a display image, corresponding respectively to the wide angle images 50 and 52, are provided on FIGS. 5 and 6.

Figure 3:
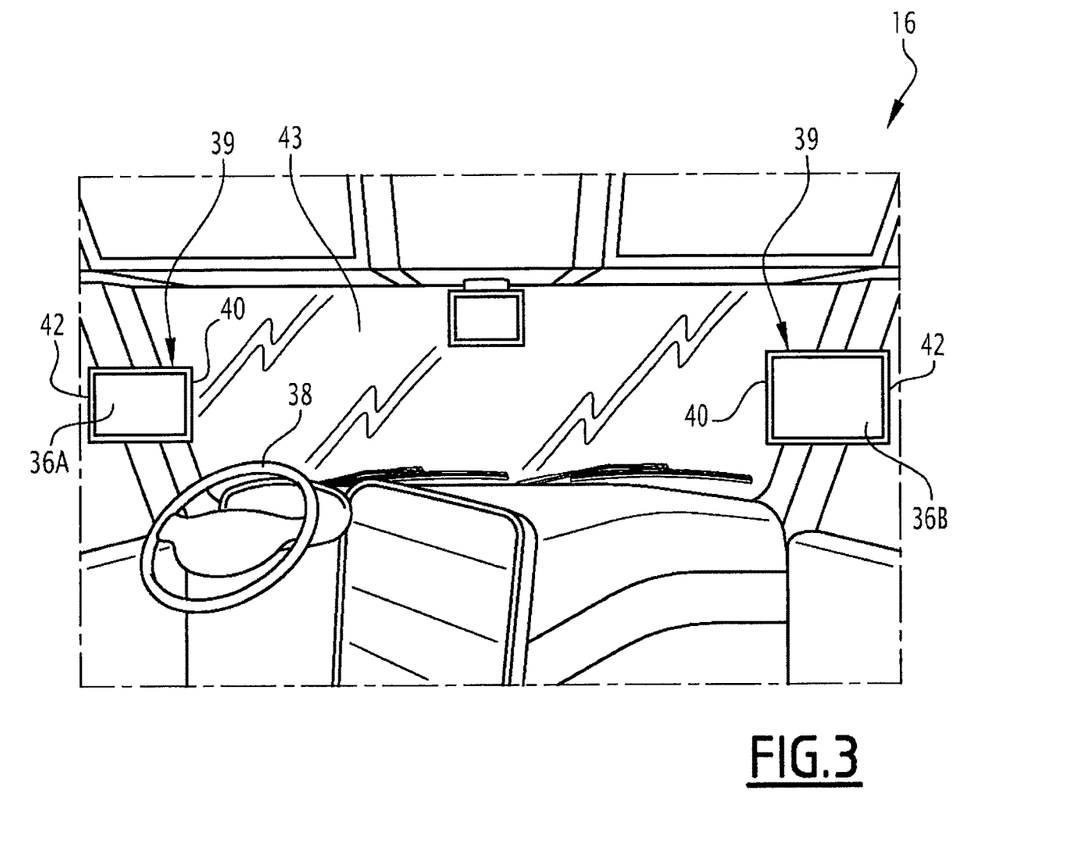
FIG. 3 is a view of the interior of a driver's cabin of the vehicle of FIG. 1.

To that end, each display, respectively 26A, 26B, comprises, with reference to FIG. 3, a display surface, respectively 36A, 36B, on which the displayed image is presented, said display surface 36A, 36B being positioned in the field of view of the driver of the truck 10. Each display 26A, 26B further comprises a display management unit (not shown) for displaying the displayed image on said surface 36A, 36B.

In the shown example, the display surface 36A, 36B of each display 26A, 26B consists of a screen.

The display surface 36A, 36B of each display 26A, 26B is provided on the same side of the cabin 16 as the associated camera 22A, 22B. Thus, the display surface 36A of the first display 26A is provided on left side of the cabin 16, while the display surface 36B of the second display 26B is provided on right side of the cabin 16.

The display surface 36A, 36B which is the farthest from the steering wheel 38 is bigger than the other display surface 36A, 36B. In the shown example, the steering wheel 38 is provided on the left side of the cabin 16; the biggest display surface is therefore display surface 36B.

Each display surface 36A, 36B is delimited by a frame 39 including an inner border 40 which is the closest to a longitudinal median plane M (FIG. 1) of the tractor 12, and an outer border 42 which is the farthest from said longitudinal median plane M. The inner and outer borders 40, 42 are thus spaced transversally from each other. Advantageously, the inner and outer borders 40, 42 are both oriented substantially vertically.

The configuration unit 30 is configured for setting a first preset limit 44 and a second preset limit 45 to the wide angle image 50, 52, so that the displayed image 60, 62 only presents the part of the wide angle image 50, 52 comprised between said preset limits 44, 45. These preset limits 44, 45 are spaced apart from each other along a horizontal direction.

As mentioned above, the determination unit 28 is configured for determining, for each camera 22A, 22B, an area of interest in the scene imaged by the camera 22A, 22B. To that end, the determination unit 28 comprises typically a gaze tracking unit (not shown) for tracking a gaze direction of the driver and a main calculator (not shown) configured for determining, depending on the gaze direction, the position of an area of interest in the scene. For instance, the main calculator is configured to determine that an area of interest exists in the scene imaged by a camera 22A, 22B when the gaze direction is oriented toward the display surface 36A, 36B of the display 26A, 26B associated to said camera 22A, 22B. The main calculator is further configured to determine that the area of interest is in an angular sector of the field of view of the camera 22A, 22B which is increasingly far from the median plane M as the distance of the gaze direction from the inner border 40 increases. In other words, the main calculator provides a bijection between the distance of the gaze direction from the inner border 40 and the angle of view of the area of interest, defined as the angle between the longitudinal median plane M and the direction connecting the area of interest to the camera 22A, 22B, said bijection being an increasing function.

Alternatively, the determination unit 28 comprises a head tracking unit (not shown) for tracking movement of a head of the driver and a main calculator (not shown) configured for determining, depending on the position of said head, the position of an area of interest in the scene. For instance, the main calculator is configured to determine that, the more the driver leans forward, the greater the angle of view of the area of interest is, said angle of view being defined as the angle between the longitudinal median plane M and the direction connecting the area of interest to the camera 22A, 22B; in other words, the main calculator provides a bijection between the distance of the distance of the head of the driver from the windshield 43 and the angle of view of the area of interest, said bijection being a decreasing function.

In another alternative, the determination unit 28 comprises a trailer tracking unit (not shown) for tracking position of the trailer 14 relatively to the tractor 12 and a main calculator (not shown) configured for determining, depending on the position of said trailer 14, the position of an area of interest in the scene.

The trailer tracking unit typically comprises a sensor for measuring an angle between the trailer 14 and the tractor 12. Alternatively, the trailer tracking unit comprises an image treatment system for identifying, in the images provided by the cameras 22A, 22B, the position of a rear end 46 (FIG. 1) of the trailer 14, and a secondary calculator configured to deduce thereof the position of the trailer 14 relatively to the tractor 12. In another alternative, the trailer tracking unit comprises sensors for measuring a steering angle of the tractor 12 and a speed of the tractor 12, and a secondary calculator configured to deduce thereof the position of the trailer 14 relatively to the tractor 12. In both latter cases, the secondary calculator may be merged with the main calculator.

The main calculator is then configured for determining that the area of interest consists of the area of the scene in which the rear end 46 of the trailer 14 is.

In still another alternative, the determination unit 28 comprises at least two of the gaze tracking unit, head tracking unit and trailer tracking unit mentioned above. In such a case, the main calculator is configured for deducing the position of the area of interest from the several pieces of information provided by the different tracking units.

Each image treatment system 24A, 24B is configured for receiving the wide angle image captured by a respective one of the cameras 22A, 22B. Each image treatment system 24A, 24B is further configured for receiving from the determination unit 28 a signal indicating the location of an area of interest in the scene imaged by said respective camera 22A, 22B when the determination unit 28 has determined that such an area of interest is present in said scene.

Figure 5:
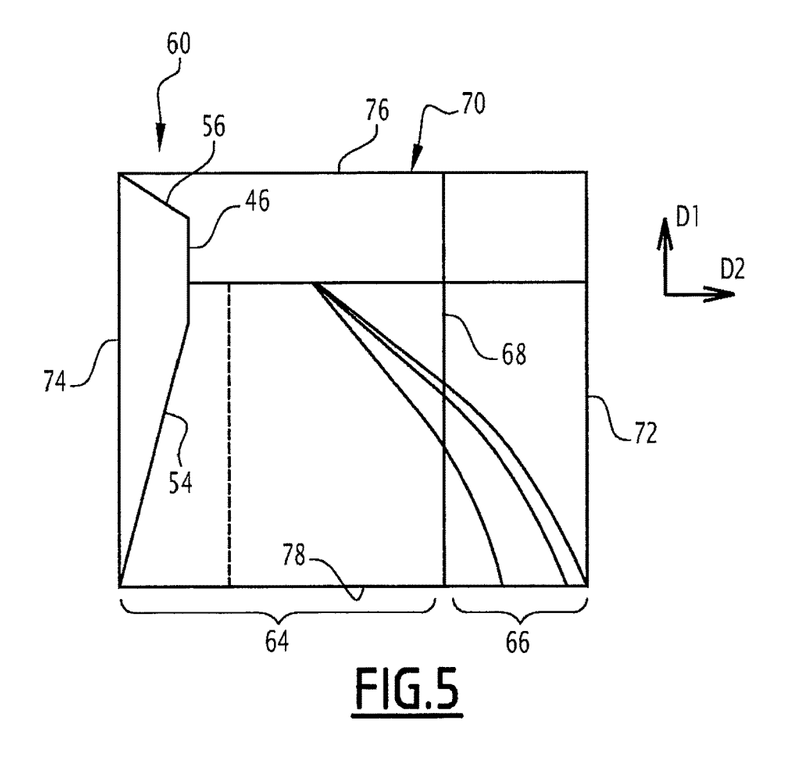
FIG. 5 is a view of a first displayed image, corresponding to the wide angle image of FIG. 4, provided by a display of the camera monitoring system of FIG. 2.
Figure 7:
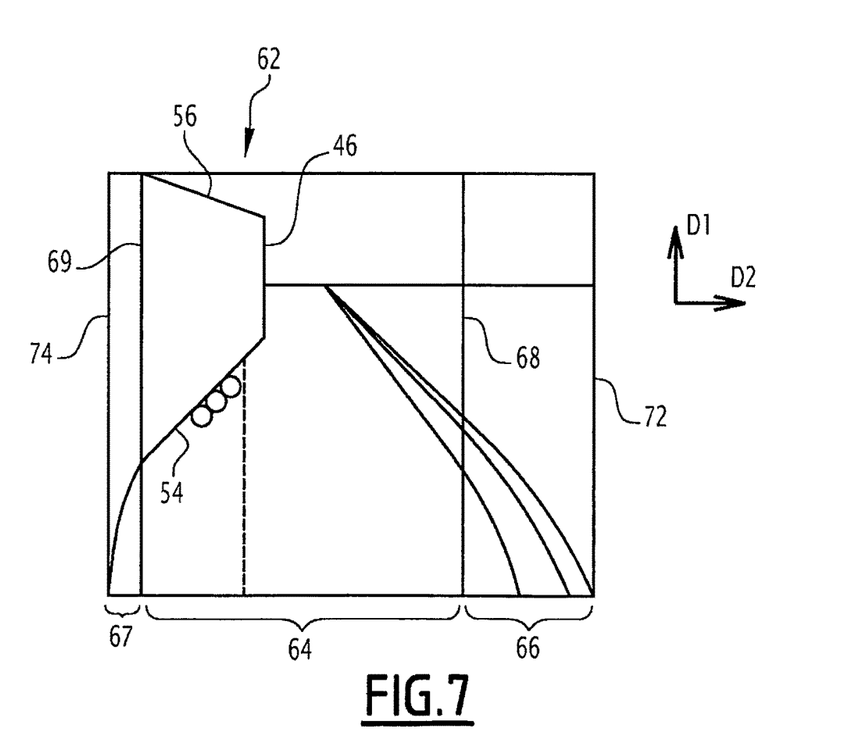
FIG. 7 is a view of a second displayed image, corresponding to the wide angle image of FIG. 6, provided by the display of the camera monitoring system of FIG. 2.

Each image treatment system 24A, 24B is configured to process the wide angle image captured by the respective camera 22A, 22B so as to provide the displayed image 60, 62, said displayed image 60, 62 comprising an undistorted portion 64 including the area of interest determined by the determination unit 28, and at least one distorted portion 66, 68.

By "undistorted portion", it is meant that the magnification factor provided by said portion 64 is constant throughout the portion 64. In other words, the relation of a dimension of an object as it is shown in the portion 64 upon the angular size of the object as it is seen by the camera 22A, 22B is the same for every object shown in the undistorted portion. As a consequence thereof, right lines, such as the edges 54, 56 of the trailer 14, are shown right in said undistorted portion 64.

The image treatment system 24A, 24B is configured to provide the displayed image 60, 62 in such a manner that the undistorted portion 64 adjoins the at least one distorted portion 66, 68. For each distorted portion 66, 67, the undistorted portion 64 thus has an interface edge 68, 69 in contact with said distorted portion 66, 67.

The image treatment system 24A, 24B is further configured to provide the displayed image 60, 62 in such a manner that the displayed image 60, 62 is continuous, i.e. so that there is not discontinuity in the image 60, 62, in particular at the interface between the undistorted portion 64 and the at least one distorted portion 66, 67.

The image treatment system 24A, 24B is configured to provide the displayed image 60, 62 within a frame 70, said frame 70 having the same shape and the same ratio as the frame 39 of the display surface 36A, 36B of the corresponding display 26A, 26B.

This frame 70 has an outer border 72, an inner border 74, an upper border 76 and a lower border 78, the upper and lower borders 76, 78 being spaced apart from each other along a first direction D1 while being substantially parallel to each other, the outer and inner border 72, 74 being spaced apart from each other along a second direction D2 while being substantially parallel to each other. Preferably, as shown, the outer and inner borders 72, 74 are substantially parallel to the first direction D1, and the upper and lower borders 76, 78 are substantially parallel to the second direction D2. Furthermore, the first and second directions D1, D2 are advantageously, as shown, substantially orthogonal to each other.

The image treatment system 24A, 24B is configured to provide the displayed image 60, 62 so that the inner border 74 consists of the first preset limit 44 of the wide angle image 50, 52, and the outer border 45 consists of the second preset limit 45 of the wide angle image 50, 5, whatever the position of the area of interest in the scene is.

The image treatment system 24A, 24B is configured to provide the or each distorted portion 66, 67 interposed between the undistorted portion 64 and a respective one of the outer and inner borders 72, 74.

The image treatment system 24A, 24B is further configured so that the or each interface edge 68, 69 of the undistorted portion 64 extends in the first direction D1.

The image treatment system 24A, 24B is configured to provide the undistorted portion 64 with a first average magnification factor along the first direction D1 and with a second average magnification factor along the second direction D2, the second average magnification factor being substantially equal to the first average magnification factor. The first magnification factor is in particular comprised between 0.2 and 1.0.

The image treatment system 24A, 24B is further configured to provide the or each distorted portion 66, 67 with a primary average magnification factor along the first direction D1 and with a secondary average magnification factor along the second direction D2. The primary average magnification factor is substantially equal to the first magnification factor, while the secondary average magnification factor is inferior to the second magnification factor.

The image treatment system 24A, 24B is configured to provide the undistorted portion 64 with a fixed width along the second direction D2, independently of the position of the area of interest in the scene. Said width is preferably more than half the width of the displayed image 60, 62, measured from the outer border 72 to the inner border 74. For instance, the width of the undistorted portion 64 is approximately two thirds of the width of the displayed image 60, 62.

The image treatment system 24A, 24B is configured to center the undistorted portion 64 on the area of interest and to displace the undistorted portion 64 in the displayed image 60, 62 depending on the position of the area of interest in the scene. Thus, if the area of interest is closer from a preset limit 44, 45 than half the width of the undistorted portion 64, as shown in FIGS. 4 and 5, then the undistorted portion 64 is in abutment against the inner or outer border 72, 74 of the displayed image 60, 62 and a single distorted portion 66 of the wide angle image 50 is provided between the undistorted portion 64 and the opposite border 72, 74. If the area of interest is farther from both preset limits 44, 45 than half the width of the undistorted portion 64, as shown in FIGS. 6 and 7, then the undistorted portion 64 is spaced from both the inner and outer borders 72, 74 of the displayed image 60, 62 and distorted portions 66, 67 of the wide angle image 50 are provided on both sides of the undistorted portion 64 between said undistorted portion 64 and both inner and outer borders 72, 74.

The corresponding display 26A, 26B is configured to display the displayed image 60, 62 as provided by the image treatment system 24A, 24B, the frame 70 of the displayed image 60, 62 matching the frame 39 of the display surface 36A, 36B, the inner border 74 matching the inner border 40 and the outer border 72 matching the outer border 42.

A method implemented by the camera monitoring system 20 to provide the driver with a side view of the truck will now be described.

First, the truck 10 is advancing straight ahead. The trailer 14 is then aligned with the tractor 12, and the image captured by the right camera 22B is then the image 50 shown in FIG. 4.

The determination unit 28 then determines that the area of interest is the angular sector in which the rear end 46 of the trailer 14 is located. This determination is made either by locating the trailer 14 relatively to the tractor 12, or by identifying an eye or head movement of the driver showing an interest of the driver in said angular sector.

This information is provided by the determination unit 28 to the image treatment system 24B, which provides the displayed image 60 of FIG. 5. This image is then displayed by the display 26B on the display surface 36B.

The truck 10 then turns right. As a consequence thereof, the trailer 14 is no longer aligned with the tractor 12 and is shifted toward the right side of the tractor 12. The image captured by the right camera 22B is then the image 52 shown in FIG. 6.

The determination unit 28 then determines that the area of interest is the angular sector in which the rear end 46 of the trailer 14 is located. This determination is made either by locating the trailer 14 relatively to the tractor 12, or by identifying an eye or head movement of the driver showing an interest of the driver in said angular sector.

This information is provided by the determination unit 28 to the image treatment system 24B, which provides the displayed image 62 of FIG. 7, where the undistorted portion 64 has been displaced relatively to the image 60. This image is then displayed by the display 26B on the display surface 36B.

Thanks to the displacement of the undistorted portion 64, the driver has a better view of the elements that are positioned on the right side of the rear end 46 of the trailer 14 and can thus more easily evaluate the distance of these objects from the rear end 46.

The invention claimed is:

1. A camera monitoring system for providing to a user a view of a scene captured by a camera, the camera monitoring system comprising:
   a first wide angle camera for capturing a first wide angle image of a scene,
   a second wide angle camera for capturing a second wide angle image of the scene,
   a determination unit for determining an area of interest in the scene, the determination unit comprising a gaze tracking unit for tracking movement of a gaze direction of the user, an image treatment system for providing an undistorted portion, including the area of interest, of each of the first wide angle image and the second wide angle image, and a display for displaying a first continuous displayed image of the first wide angle image and a second continuous displayed image of the second wide angle image, each of the first displayed image and the second displayed image comprising the undistorted portion adjoining and continuous with at least one distorted portion, wherein:
each of the first wide angle image and the second wide angle image has first and second preset limits and each of the first displayed image and the second displayed image has first and second opposed borders, the at least one distorted portion being interposed between the undistorted portion and a respective one of the first and second borders, the display being configured to display the first preset limit at the first border and the second preset limit at the second border independently of a position of the area of interest; and the undistorted portion of each of the first displayed image and the second displayed image has a first average magnification factor along a first direction and a second average magnification factor along a second direction, orthogonal to the first direction, the first and second average magnification factors being substantially equal to each other.

2. The camera monitoring system of claim 1, wherein the first and second borders are spaced away from each other along the second direction, and are preferably substantially parallel to the first direction.

3. The camera monitoring system of claim 1, wherein the distorted portion has a primary average magnification factor along the first direction and a secondary average magnification factor along the second direction, the primary average magnification factor being substantially equal to the first average magnification factor, the secondary average magnification factor being less than the second average magnification factor.

4. The camera monitoring system of claim 1, wherein, for the displayed distorted portion, the undistorted portion has an interface edge in contact with the distorted portion, the interface edge extending along the first direction.

5. The camera monitoring system of claim 1, wherein the first average magnification factor is comprised between 0.2 and 1.0.

6. The camera monitoring system of claim 1, wherein the determination unit comprises a head tracking unit for tracking movement of a head of the user.

7. The camera monitoring system of claim 1, wherein the display is configured for displacing the undistorted portion in each of the first displayed image and the second displayed image depending on the position of the area of interest in the scene.

8. The camera monitoring system of claim 1, wherein each of the first wide angle camera and the second wide angle camera are configured for refreshing, respectively, the first wide angle image and the second wide angle image at a predetermined frequency.

9. An automotive vehicle comprising a camera monitoring system for providing to a user a view of a scene captured by a camera, the camera monitoring system comprising:
a first wide angle camera for capturing a first wide angle image of a scene,
a second wide angle camera for capturing a second wide angle image of the scene,
a determination unit for determining an area of interest in the scene, the determination unit comprising a gaze tracking unit for tracking movement of a gaze direction of the user,
an image treatment system for providing an undistorted portion, including the area of interest, of each of the first wide angle image and the second wide angle image, and
a display for displaying a first continuous displayed image of the first wide angle image and a second continuous displayed image of the second wide angle image, each of the first displayed image and the second displayed image comprising the undistorted portion adjoining and continuous with at least one distorted portion, wherein:
each of the first wide angle camera and the second wide angle camera are oriented toward a rear of the vehicle, the display comprising a display surface on which the displayed image is presented, the display surface being positioned in a field of view of a driver of the vehicle;

each of the first wide angle image and the second wide angle image has first and second preset limits and each of the first displayed image and the second displayed image has first and second opposed borders, the at least one distorted portion being interposed between the undistorted portion and a respective one of the first and second borders, the display being configured to display the first preset limit at the first border and the second preset limit at the second border independently of a position of the area of interest; and the undistorted portion of each of the first displayed image and the second displayed image has a first average magnification factor along a first direction and a second average magnification factor along a second direction, orthogonal to the first direction, the first and second average magnification factors being substantially equal to each other.

10. The automotive vehicle of claim 9, comprising a tractor and a trailer, wherein the determination unit comprises a trailer tracking unit for tracking a position of the trailer relatively to the tractor.

11. A method for providing to a user a view of a scene captured by a camera, the method comprising:
capturing a first wide angle image of a scene with a first wide angle camera and a second wide angle image of the scene with a second wide angle camera,
determining an area of interest in the scene,
tracking movement of a gaze direction of the user,
providing an undistorted portion, including the area of interest, for each of the first wide angle image and the second wide angle image, and
displaying, for each of the first wide angle image and the second wide angle image, a continuous displayed image of the first wide angle image and the second wide angle image, the displayed image comprising the undistorted portion adjoining and continuous with at least one distorted portion, wherein:
each of the first wide angle image and the second wide angle image has first and second preset limits and each of the first displayed image and the second displayed image has first and second opposed borders, the at least one distorted portion being interposed between the undistorted portion and a respective one of the first and second borders, displaying the first preset limit at the first border and the second preset limit at the second border independently of a position of the area of interest; and the undistorted portion of each of the first displayed image and the second displayed image having a first average magnification factor along a first direction and a second average magnification factor along a second direction, orthogonal to the first direction, the first and second average magnification factors being substantially equal to each other.

* * * * *